United States Patent

Schock et al.

Patent Number: 6,065,454
Date of Patent: May 23, 2000

[54] METHOD AND APPARATUS FOR ACTIVE CONTROL OF THE COMBUSTION PROCESSES IN AN INTERNAL COMBUSTION ENGINE

[75] Inventors: Harold J. Schock; Manoochehr Koochesfahani, both of Okemos, Mich.; Daniel G. Nocera, Winchester, Mass.

[73] Assignee: Michigan State University, Lansing, Mich.

[21] Appl. No.: 08/927,987

[22] Filed: Sep. 12, 1997

[51] Int. Cl.[7] .................................................. F02M 27/08
[52] U.S. Cl. ............................................................. 123/537
[58] Field of Search ..................................... 123/537, 536, 123/198 E, 184.53

[56] References Cited

U.S. PATENT DOCUMENTS

| | | |
|---|---|---|
| 2,414,494 | 1/1947 | Vang . |
| 2,436,570 | 2/1948 | Hancock . |
| 2,454,900 | 11/1948 | Vang . |
| 2,732,835 | 1/1956 | Hundt ...................................... 123/537 |
| 2,737,163 | 3/1956 | Hundt . |
| 2,800,100 | 7/1957 | Boucher ............................... 123/198 E |
| 2,949,900 | 8/1960 | Bodine . |
| 2,951,473 | 9/1960 | Bodine . |
| 3,907,940 | 9/1975 | Thatcher .............................. 123/198 E |
| 5,176,114 | 1/1993 | Brackett . |

FOREIGN PATENT DOCUMENTS

| | | |
|---|---|---|
| 0 492 787 | 7/1992 | European Pat. Off. . |
| 2 203 488 | 10/1988 | United Kingdom . |

*Primary Examiner*—Marguerite McMahon
*Attorney, Agent, or Firm*—Brooks & Kushman P.C.

[57] ABSTRACT

The performance of an internal combustion engine is optimized utilizing an electrically controlled driver which is located relative to the intake port to excite the intake charge at a selected frequency, duration and power level which depends on the engine operating condition. The purpose of this excitation is to control combustion by optimizing large scale recirculation patterns of the intake charge within the combustion chamber. In particular, this device will provide the effect of optimizing volumetric efficiency at wide open throttle and minimize fuel consumption and emissions at part throttle. An electronic engine controller varies the operation of the drive device as a function of engine operating conditions. The driver excites the intake charge at a frequency of about 5 to 1000 times of the engine speed.

30 Claims, 4 Drawing Sheets

METHOD AND APPARATUS FOR ACTIVE CONTROL OF THE COMBUSTION PROCESSES IN AN INTERNAL COMBUSTION ENGINE

This invention was made with government support under DMR-9400417 awarded by NSF. The government has certain rights in the invention.

TECHNICAL FIELD

This invention relates to internal combustion engines having a driver for exciting the intake charge.

BACKGROUND ART

For over 50 years, automotive engineers have been experimenting with acoustic drivers acting upon the intake charge of an internal combustion engine to solve a variety of problems. An example of such early work are a pair of patents, U.S. Pat. No. 2,414,494 (Vang) and U.S. Pat. No. 2,454,900 (Bodine). The preceding patents illustrate a series of devices located in the induction system or alternatively, within the confines of the combustion chamber to excite the air fuel mixture at sonic or supersonic frequencies, for the purposes atomizing the air fuel mixture. Substantially concurrently with the work of a William Hancock, U.S. Pat. No. 2,436,570, relating to the use of high frequency pressure pulsations in the intake charge to suppress detonation, Hancock suggested the use of in-chamber as well as intake manifold mounted diagram type vibrating actuators for exciting the intake charge in order to create high frequency pressure pulsations with the cylinder.

Approximately 10 years after the early work of Vang and Hancock, Ebhardt Hundt of Daimler-Benz, obtained a U.S. Pat. No. 2,737,163 relating to a vibrating driver to be mounted directly within the combustion chamber for ultrasonically exciting the intake charge. The driver had a specific structure designed to withstand the pressure and thermal loads resulting from its direct location in the combustion chamber. The Hundt device operated at frequencies up to 20 hertz that was intended to atomize fuel droplets prior to the completion of the compression stroke.

As an alternative to exciting the inner fuel mixture using a diaphragm type actuator. U.S. Pat. No. 2,949,900 of Albert Bodine disclosed a direct in the chamber injector which sonically pulsated the injected fuel at 5,000 to 50,000 cycles per second in order to improve fuel atomization.

SUMMARY OF THE INVENTION

A method and apparatus for the active control of the flow field in an internal combustion engine utilizing an electronically controlled driver is provided. The internal combustion engine includes a head and block assembly defining a combustion chamber with an intake port and an associated intake valve for cyclically introducing an intake charge into the combustion chamber. The driver is affixed to the head and block assembly at a location relative to the intake port to excite the intake charge at a selected acoustic frequency duration and energy level in order to optimize large scale recirculation patterns of the intake charge within the combustion chamber. An electronic engine control regulates the operation of the driver as a function of engine operating conditions.

In the preferred embodiment, electronic engine control varies both the frequency, the "on" duration, and the energy level of the driver as a function of engine speed and load with the frequency increasing as engine speed increases. Preferably, the driver frequency is optimized to provide the desired recirculation pattern within the combustion chamber.

Two alternative charge drivers are illustrated. One driver is located within the intake upstream of the intake valve for exciting the intake charge. The alternative driver is provided by an electro-mechanical actuator which axially oscillates the intake valve during the intake cycle.

The object of the present invention is to optimize large scale recirculation patterns of the intake charge within the combustion chamber by perturbing the intake flow through the intake valve opening.

An object of the present invention is to maximize volumetric flow efficiency at wide open throttle while minimizing fuel consumption and emissions output at part throttle.

These and other objects and advantages of the present invention will become more apparent upon reading the specification in conjunction with the drawings.

BEST MODE FOR CARRYING OUT THE INVENTION

Figure 1:
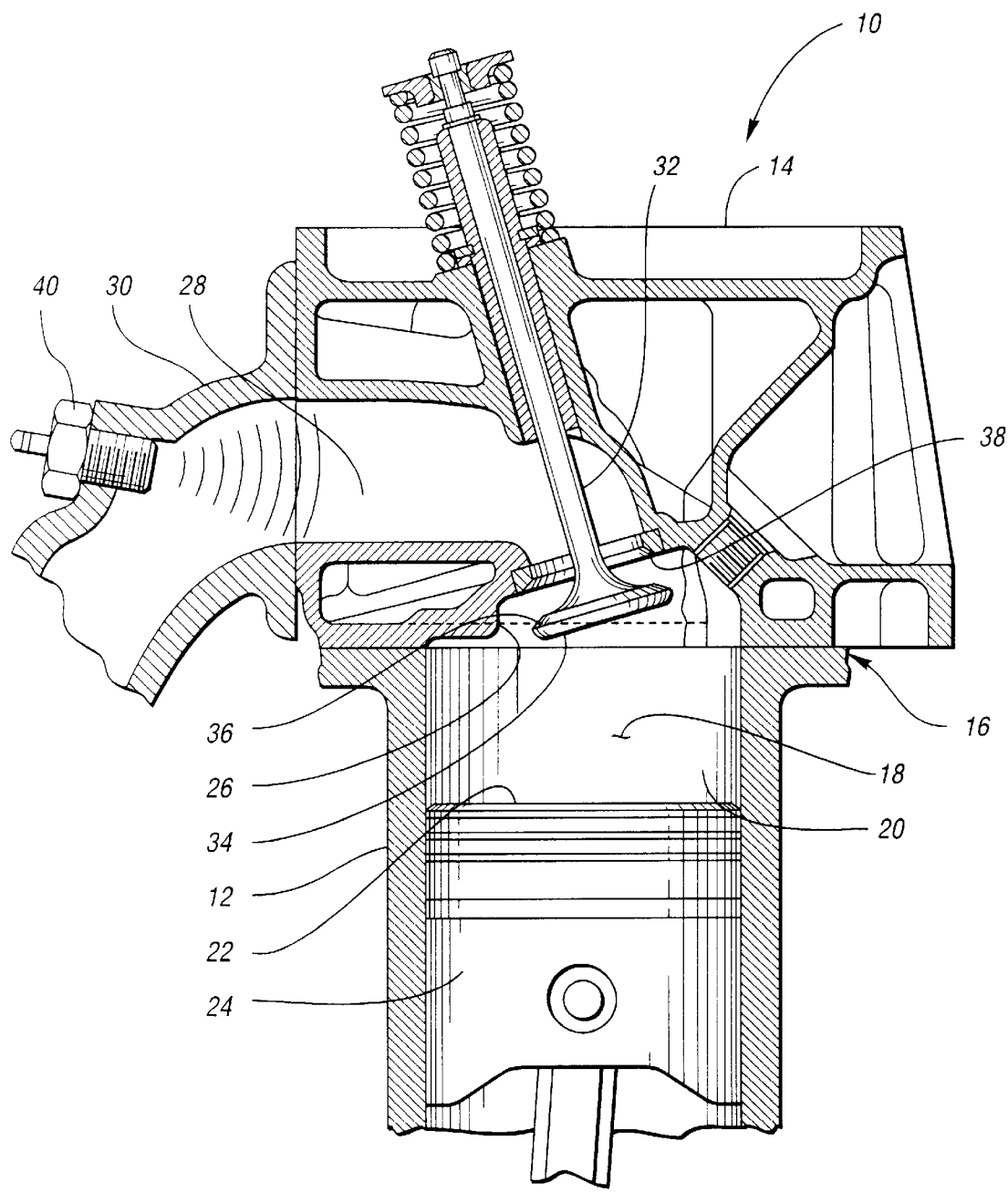
FIG. 1 is a partial cross-sectional side elevation of the first embodiment of an internal combustion engine.

An internal combustion engine 10 illustrating a preferred embodiment of the present invention is illustrated with reference to FIGS. 1–3. Engine 10 in the preferred embodiment is a spark ignited four cycle engine, however, it should be appreciated that the present invention can alternatively be used on two cycle spark ignited engines as well as two or four cycle diesel engines. Engine 10 is provided with engine block 12 and a cylinder head 14 which collectively form a head and engine block assembly 16. The head and engine block assembly define an internal combustion chamber 18 bounded by cylindrical wall 20 of a cylinder bore formed in engine block 12 top 22 of piston 24 and the chamber portion 26 of cylinder head 14. intake port 28 is formed collectively by an internal passageway in head 14 and in intake manifold 30. Intake valve 32 is of conventional design cyclically opening to allow an intake charge to be introduced into the combustion chamber and closing to isolate the intake port 28 from combustion chamber 18. Intake valve 32 is provided with a head 34 having a frusto conical valve face 36 which cooperates with a corresponding frusto conical seat 38 formed at the junction of intake 28 and cylinder head chamber portion 26.

Engine 10 illustrating the first embodiment of the invention is provided with an electrically controlled driver 40 which is affixed to the head and block assembly 16. Driver 40 is oriented relative to the intake port to excite the intake charge passing therethrough. In the embodiment illustrated, driver 40 is located in the intake manifold 30, however, it should be appreciated that driver 40 can be alternatively located within the cylinder head 14 or in a portion of the intake manifold further upstream than the location illustrated. Driver 40 is capable of operating at a range of frequencies and power levels which are selected to optimize the flow of the intake charge through the valve opening. Due to the sharp edges and the valve, valve seat and the irregular shape of the combustion chamber, flow of air fuel mixture into the chamber can be quite unstable and susceptible to external and deliberate perturbation. The purpose of driver 40 is to excite the charge at a frequency and amplitude in order to optimize large scale recirculation patters of intake charge within the combustion chamber. Large scale recirculation patterns such as tumble and swirl persist after the intake valve is closed and significantly affect the combustion process. It has been determined that by acoustically exciting the intake charge as it flows through the valve, large scale recirculation patterns within the combustion chamber can be significantly varied.

Driver 40 of the present invention has an output which varies in frequency and energy level which varies as a function of engine operating conditions. Preferably, as engine speed increases, the driver frequency will increase. The drive frequency of the driver 40 is between 5 and 1000 times the engine RPM. The precise frequency and energy level of the driver output needs to be experimentally determined for each engine throughout the range of speed and load conditions in which the engine is typically operated. The conventional electronic engine control system used to regulate fuel injector duration and spark advance is ideally suitable for also regulating driver frequency and power level. Calibration for the driver is maintained in three-dimensional map or a series of a look-up tables stored in the electronic engine control and used to generate a driver output signal which is transmitted to driver 40.

Figure 2:
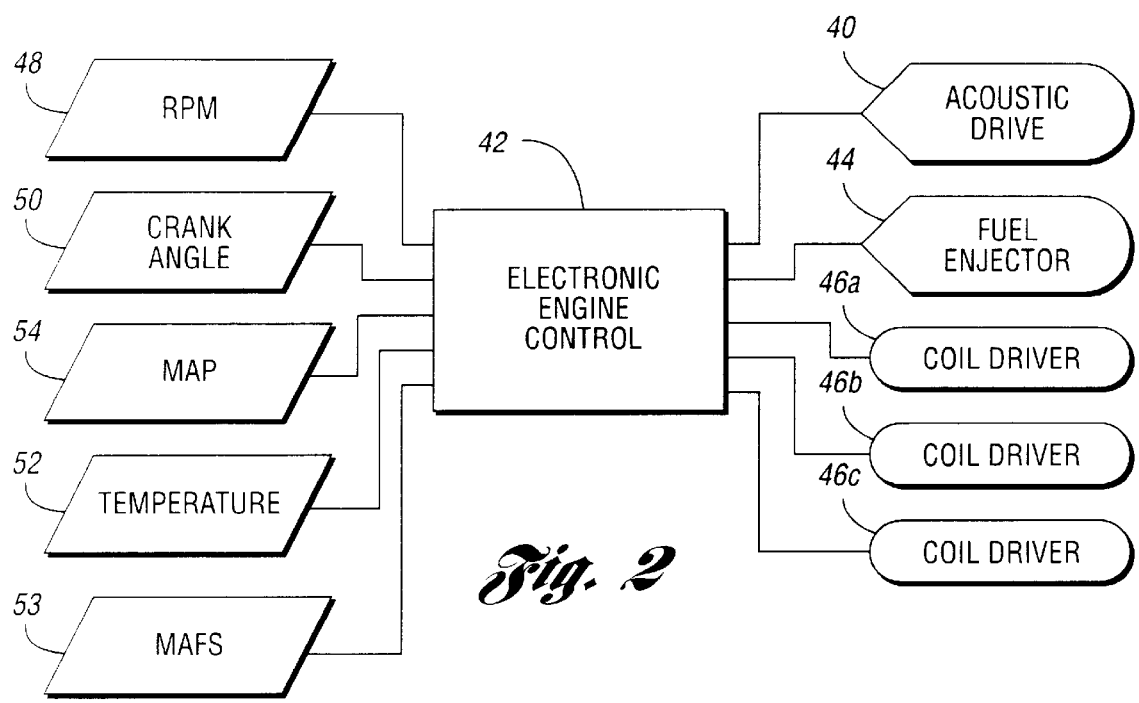
FIG. 2 is a block diagonal of the electronic engine control system.
Figure 3:
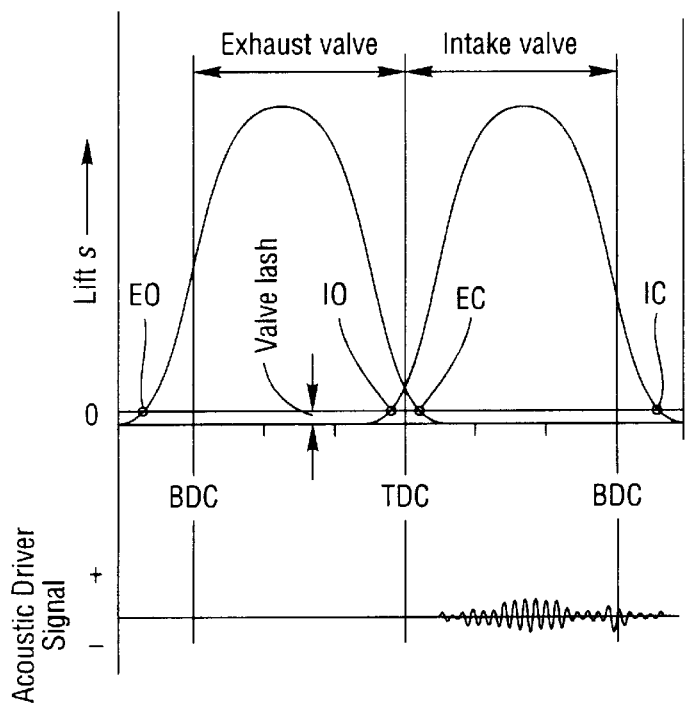
FIG. 3 is a timing chart illustrating cylinder pressure, valve left and acoustic drive power as a function of crank shaft position.
Figure 4:
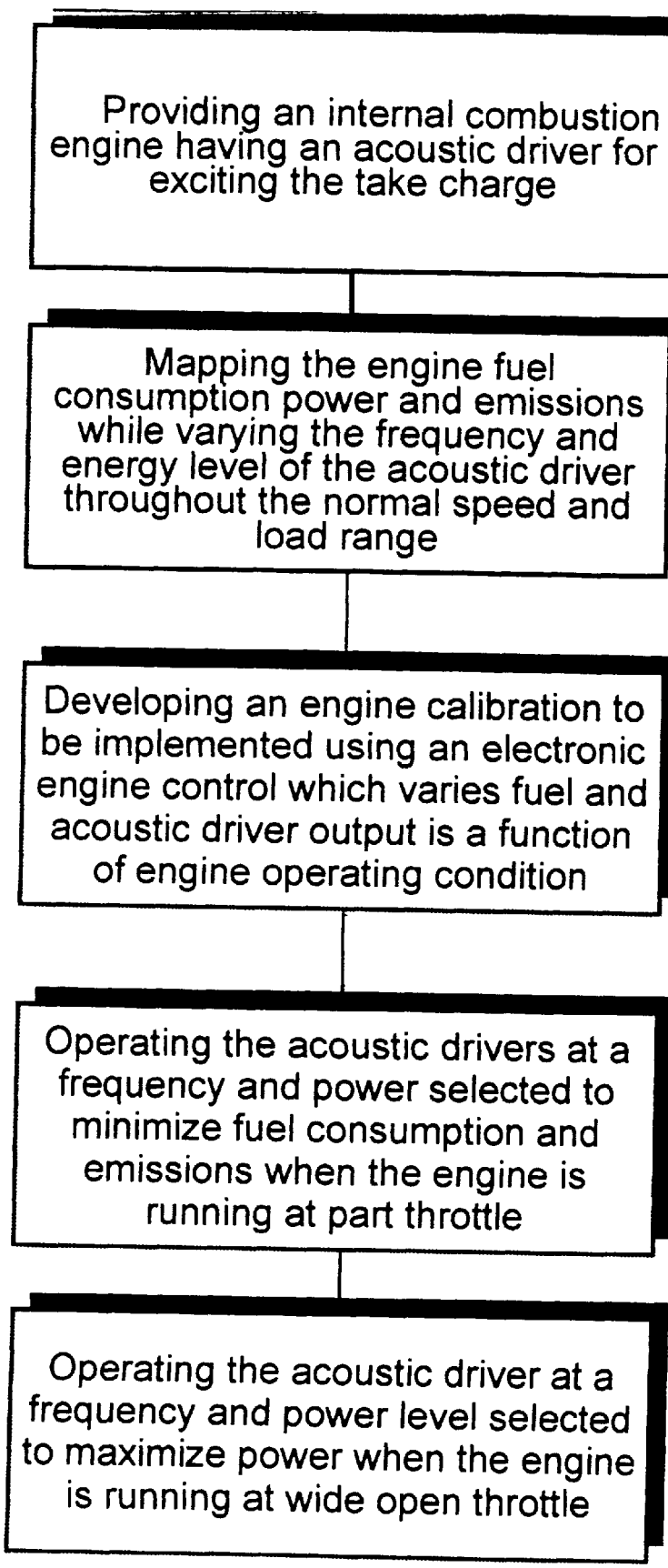
FIG. 4 is a flow chart illustrating the method of optimizing engine performance.

As illustrated in FIG. 2, electronic engine control 42 has outputs coupled to driver 40, fuel injector 44 and ignition coil drivers 46a, 46b and 46c. An electronic engine control 42 is provided with a series of conventional inputs, engine RPM 48, crank angle position 50, engine temperature 52, mass air flow (MAF) 53 and manifold absolute pressure (MAP) 54. illustrated in FIG. 3, the driver 40 need not be operated continuously. Rather, driver 40 need only be operated during the intake event and this driver power can be conserved. Additionally, the frequency and power level of the driver can be varied within each intake event in order to optimize performance.

The use of driver 40 to excite the intake charge, enables engine designer to select an driver frequency and energy level optimizing volumetric efficiency and power output when the engine is running at wide open throttle and optimizing combustion efficiency and emissions levels when the engine is run at part throttle conditions. It is believed that the driver of the present invention will be a valuable tool in optimizing engine performance.

In calibrating an engine equipped with an driver to excite the intake charge, the engine designer must map the engine's performance characteristics, monitoring fuel consumption, power output and emissions while varying the frequency of the driver power levels. This is a particularly complex task since varying the driver frequency and energy level will affect the combustion and the optimum spark timing. Therefore, at each selected speed and load condition, an optimum driver operating signal and spark advance will need to be concurrently established. Once the engine designer has developed an engine calibration map, the electronic engine control is then programmed with either in a series of look up tables using a three dimensional surface in a manner similar to that used for spark advance control.

In the preferred embodiment of the invention, when the engine is running in a wide open throttle, the driver will operate at a selected frequency and power level selected to maximize volumetric efficiency. Preferably, when the engine is running at part throttle, a driver will be operated at a frequency and power level designed to optimize fuel consumption and emissions.

It should be appreciated that a wide variety of drivers can be utilized in practicing the present invention. Driver 40 can be an electro mechanical type or a piezoelectric device. The driver, however, need not be placed in the intake port, rather, as illustrated in engine 60, shown in FIG. 5, the driver 62 may be used to axially oscillate intake valve 64, thereby exciting the flow of the intake charge through the valve opening. Engine 60 utilizes a push rod 66 and a rocker arm 68 for cyclically actuating intake valve 64.

Figure 5:
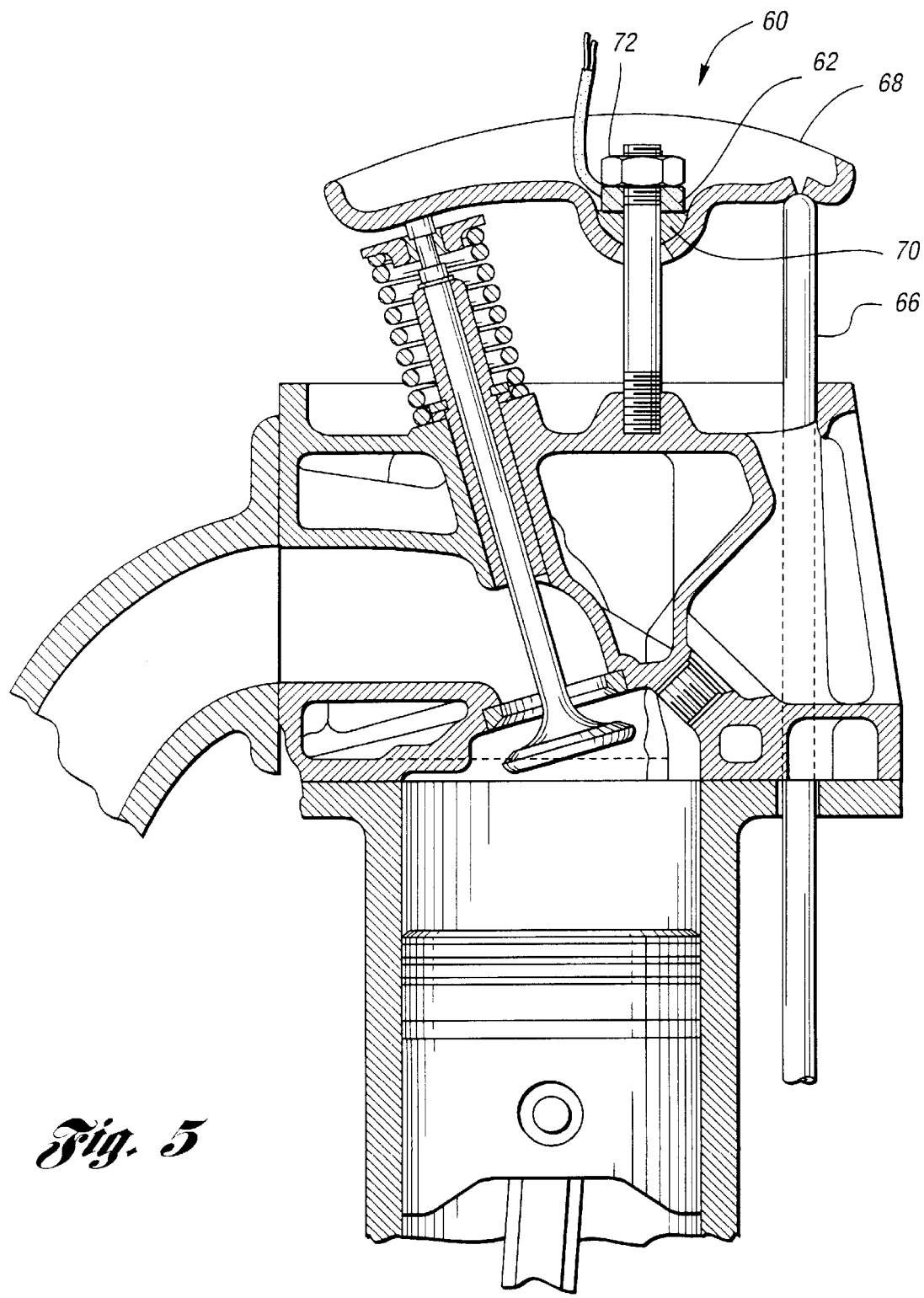
FIG. 5 is a partial and cross-sectional side view of an alternative engine embodiment of the invention.

It should be appreciated that a wide variety of other mechanical mechanisms and micro-electro mechanical actuators can be used to oscillate intake valve 64 and the illustration of FIG. 5 is intended to be a mere example of a representative system. Driver 62 is located between semi-spherical ball 70 and nut 72. As driver 62 is actuated, it will vary in thickness causing the center of rocker arm 68 to be vertically oscillated which in turn, pivots the rocker arm 68 about the end of push rod 66.

When the valve is lifted as illustrated in FIG. 5, oscillation of the driver 62 will be translated into axial motion of intake valve 64. In the embodiment of engine 60, it is desirable to only oscillate the intake valve when the valve is open. Accordingly, the power will is not to be supplied to the actuator until the valve is lifted sufficiently from the seat to avoid chattering, power to the driver will be terminated prior to returning to the closed position.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A multi-cycle internal combustion engine having a head and block assembly defining a combustion chamber provided with an intake port and an associated intake valve for cyclically introducing an intake charge into the combustion chamber, the engine comprising:

an electrically controlled driver affixed to the head and block assembly located relative to the intake port to excite the intake charge during an intake event causing the intake charge to be acoustically oscillated a plurality of times during the intake event at a frequency and energy level selected to optimize large scale recirculation patterns of the intake charge within the combustion chamber; and an electronic engine control regulating the operation of the internal combustion engine varying fuel flow and the driver as a function of engine operating conditions, wherein the electronic engine control varies the energy level of the driver as a function of engine speed and load.

2. The engine of claim 1 wherein the electronic engine control increases the frequency of the driver as the engine speed increases.

3. The engine of claim 1 wherein the driver is located upstream of the intake valve and is provided with a diaphragm for exciting the intake charge.

4. The engine of claim 1 wherein the driver is an electro mechanical actuator which axially oscillates the intake valve.

5. The engine of claim 1 wherein the electronic engine control varies the frequency of the driver as a function of engine, speed and load.

6. The engine of claim 1 wherein the electronic engine control further regulates the operation of the driver to turn the driver on and off at selected times within each engine cycle with the duration of the driver on period varying as a function of engine speed and load.

7. The engine of claim 1 wherein the electronic engine control varies in the operation of the driver within each engine cycle.

8. The engine of claim 1 wherein the electronic engine control operates the driver at a frequency 5 to 1000 times the speed of the engine in RPM.

9. The engine of claim 1 wherein the electronic engine control operates the driver at a frequency and energy level selected to optimize the volumetric efficiency when the engine is run at wide open throttle.

10. The engine of claim 1 wherein the electronic engine control operates the driver at a frequency and energy level selected to minimize fuel consumption and emissions when the engine is operated at part throttle.

11. The engine of claim 1 wherein the engine is a four cycle spark ignited engine having a spark timing regulated by the electronic engine control.

12. A multi-cycle internal combustion engine having a head and block assembly defining a combustion chamber provided with an intake port and an associated intake valve for cyclically introducing an intake charge into the combustion chamber, the engine comprising:

an electrically controlled driver affixed to the head and block assembly located relative to the intake port to excite the intake charge during an intake event causing the intake charge to be acoustically oscillated a plurality of times during the intake event at a frequency and energy level selected to optimize large scale recirculation patterns of the intake charge within the combustion chamber; and an electronic engine control regulating the operation of the internal combustion engine varying fuel flow and the driver as a function of engine operating conditions, wherein the electronic engine control varies the frequency of the driver as a function of engine speed.

13. The engine of claim 1 wherein the electronic engine control operates the driver at a frequency 5 to 1000 times the speed of the engine in RPM.

14. The engine of claim 12 wherein the driver is located upstream of the intake valve and is provided with a diaphragm for exciting the intake charge.

15. The engine of claim 12 wherein the driver is an electro mechanical actuator which axially oscillates the intake valve.

16. The engine of claim 12 wherein the electronic engine control varies the energy level of the driver as a function of engine speed and load.

17. The engine of claim 12 wherein the electronic engine control further regulates the operation of the driver to turn the driver on and off at selected times within each engine cycle with the duration of the driver on period varying as a function of engine speed and load.

18. The engine of claim 12 wherein the electronic engine control varies in the operation of the driver within each engine cycle.

19. The engine of claim 12 wherein the electronic engine control operates the driver at a frequency and energy level selected to optimize the volumetric efficiency when the engine is run at wide open throttle.

20. The engine of claim 12 wherein the electronic engine control operates the driver at a frequency and energy level selected to minimize fuel consumption and emissions when the engine is operated at part throttle.

21. The engine of claim 12 wherein the engine is a four cycle spark ignited engine having a spark timing regulated by the electronic engine control.

22. A four cycle spark ignited internal combustion engine having head and block assembly defining a combustion chamber provided with an intake port and an associated intake valve for cyclically introducing an intake charge into the combustion chamber, the engine comprising:

an electrically controlled driver affixed to the head and block assembly and located relative to the intake port to excite the intake charge during an intake event causing the intake charge to be acoustically oscillated a plurality of times during the intake event at a frequency and energy level which are selected to optimize large scale recirculation patterns of the intake charge within the combustion chamber; and an electronic engine control for regulating the operation of the internal combustion engine varying fuel flow, spark timing and the frequency and power level of the driver as a function of engine operating condition wherein the frequency of the driver generally increases as a function of engine speed and has a drive frequency between 5 and 1000 times the engine rpm.

23. A method of regulating the operation of a multi-cycle internal combustion engine having a head and block assembly defining a chamber provided with an intake port and associated intake valve for cyclically introducing an intake charge into the combustion chamber, and an electronic engine control regulating the operation of the engine and varying fuel flow as a function of speed and load, the method comprising:

exciting the intake charge during an intake event causing the intake charge to be acoustically oscillated a plurality of times during the intake event using an electronically controlled driver coupled to the head block assembly and located relative to the intake port which are selected to optimize to excite the intake charge; and regulating the operation of the driver utilizing the electronic engine control as a function of engine operating conditions to optimize large scale recirculation patterns of the intake charge within the combustion chamber.

24. The method of claim 23 wherein the operation of the driver is regulated as a function of engine, speed and load.

25. The method of claim 23 wherein the frequency level of the driver is varied as a function of engine, speed and load.

26. The method of claim 23 wherein both the frequency and the power level of the driver is varied as a function of engine speed.

27. A method of optimizing the performance of the multi-cycle internal combustion engine having an electronic engine control which executes an engine calibration to generate a plurality of control signals to regulate the operation of the engine, and a head block assembly defining a combustion chamber provided with an intake port and associated intake valve for cyclically introducing intake charge into a combustion chamber, the method comprising:

installing an electronically controlled driver on the head block assembly located relative to the intake port to excite the intake charge during an intake event causing the intake charge to be acoustically oscillated a plurality of times during the intake event at a frequency and an energy level selected to effect large scale recirculation patterns of the intake charge within the combustion chamber;

mapping engine fuel economy, power and emissions at normally occurring operating speeds and loads while varying the frequency and power level of the driver;

developing an engine calibration which varies the frequency and power level of the driver as a function of operating condition; and programming the electronic engine control to generate a control signal for regulating the operation of the driver to implement the developed engine calibration.

28. The method of claim 27 wherein the developing of the engine calibration further comprises selecting a driver frequency and an energy level which maximizes engine power output at wide open throttle conditions.

29. The method of claim 27 wherein developing an engine calibration further comprises selecting a driver frequency energy level which minimizes fuel consumption and emissions at part throttle engine conditions.

30. The method of claim 27 further comprising varying the control signal to the driver within each engine operating cycle to optimize engine performance.

* * * * *